(12) United States Patent
Someya et al.

(10) Patent No.: US 8,139,157 B2
(45) Date of Patent: Mar. 20, 2012

(54) VIDEO DISPLAY APPARATUS THAT ADJUSTS VIDEO DISPLAY PARAMETERS BASED ON VIDEO PICTURE TYPE

(75) Inventors: Jun Someya, Tokyo (JP); Kazuo Kyuma, Tokyo (JP); Kazuhiko Tsutsumi, Tokyo (JP); Hiroaki Sugiura, Tokyo (JP); Hironobu Yasui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1124 days.

(21) Appl. No.: 12/003,176

(22) Filed: Dec. 20, 2007

(65) Prior Publication Data

US 2008/0186413 A1 Aug. 7, 2008

(30) Foreign Application Priority Data

Feb. 2, 2007 (JP) ................................ 2007-023875

(51) Int. Cl.
- *H04N 5/14* (2006.01)
- *H04N 5/57* (2006.01)
- *H04N 9/64* (2006.01)
- *H04N 5/21* (2006.01)
- *H04N 9/77* (2006.01)

(52) U.S. Cl. ........ 348/672; 348/603; 348/650; 348/631; 348/703; 348/712

(58) Field of Classification Search .................. 348/631, 348/603, 650, 672, 703, 712
See application file for complete search history.

(56) References Cited

U.S. PATENT DOCUMENTS

| | | | |
|---|---|---|---|
| 4,763,186 A * | 8/1988 | Belmares-Sarabia et al. | 348/650 |
| 6,433,838 B1 * | 8/2002 | Chen | 348/674 |
| 7,671,901 B2 * | 3/2010 | Masuda et al. | 348/229.1 |
| 7,929,058 B2 * | 4/2011 | Kim | 348/607 |
| 7,952,645 B2 * | 5/2011 | Masuda et al. | 348/576 |
| 2006/0215044 A1 * | 9/2006 | Masuda et al. | 348/224.1 |
| 2007/0115392 A1 * | 5/2007 | Masuda et al. | 348/678 |
| 2009/0002517 A1 * | 1/2009 | Yokomitsu et al. | 348/223.1 |
| 2011/0181785 A1 * | 7/2011 | Masuda et al. | 348/624 |

FOREIGN PATENT DOCUMENTS

| | | | |
|---|---|---|---|
| JP | 10-322622 | * | 12/1998 |
| JP | 10-322622 A | | 12/1998 |
| JP | 2002-520747 A | | 7/2002 |
| JP | 2004-7301 A | | 1/2004 |
| WO | WO-00/04498 A1 | | 1/2000 |

\* cited by examiner

*Primary Examiner* — Hoang-Vu A Nguyen-Ba
(74) *Attorney, Agent, or Firm* — Birch, Stewart, Kolasch & Birch, LLP

(57) ABSTRACT

A video display apparatus generates luminance information for individual frames of a video signal from histograms of the luminance component of the video signal, and classifies the content of the video signal on the basis of this information. Color saturation information is also generated from color saturation histograms, and scene changes are detected. Video correction parameters and display control parameters are derived from the content classification and color saturation information. The video signal is corrected according to the video correction parameters, and displayed according to the display control parameters. Display characteristics suitable for the video content are thereby obtained. The parameters are changed when a scene change is detected, so that the viewer is not disturbed by the change in video display characteristics.

9 Claims, 12 Drawing Sheets

FIG.8

|    | D104 | D103 | D102 | D101 | Ji  |
|----|------|------|------|------|-----|
| 1  | S    | S    | S    | S    | J1  |
| 2  | S    | S    | S    | M    | J2  |
| 3  | S    | S    | S    | L    | J3  |
| 4  | S    | S    | M    | S    | J4  |
| 5  | S    | S    | M    | M    | J5  |
| 6  | S    | S    | M    | L    | J6  |
| 7  | S    | S    | L    | S    | J7  |
| 8  | S    | S    | L    | M    | J8  |
| 72 | L    | M    | L    | L    | J72 |
| 73 | L    | L    | S    | S    | J73 |
| 74 | L    | L    | S    | M    | J74 |
| 75 | L    | L    | S    | L    | J75 |
| 76 | L    | L    | M    | S    | J76 |
| 77 | L    | L    | M    | M    | J77 |
| 78 | L    | L    | M    | L    | J78 |
| 79 | L    | L    | L    | S    | J79 |
| 80 | L    | L    | L    | M    | J80 |
| 81 | L    | L    | L    | L    | J81 |

FIG.9

| D104 | D103 | D102 | D101 | Ji | GENRE |
|---|---|---|---|---|---|
| S | M | L | M | | |
| M | M | S, M | S, M | | |
| | | L | M | J1 | SPORTS |
| | L | S, M, L | S, M, L | | |
| L | S | S | M | | |
| | L | S | S, M, L | | |
| M | S | S | M, S | | |
| | | M, L | S, M, L | J2 | MUSIC |
| L | S | S | L | | |
| S | M | L | L | | |
| | L | L | L | | |
| M | M | L | S | | |
| L | S | M | L | J3 | STUDIO |
| | | L | S, M, L | | |
| | M | S, M, L | S, M, L | | |
| | L | M | S, M, L | | |
| | | L | S, M, L | | |
| S | S | S, M, L | S, M, L | | |
| | M | S | S, M, L | | |
| | | M | S, M | | |
| | | L | S | | |
| | L | S, M | S, M, L | J4 | MOVIE |
| | | L | S, M | | |
| M | S | S | S | | |
| L | S | S | S | | |
| | | M | S | | |
| S | M | M | L | | |
| M | M | S, M, L | L | J5 | DRAMA & ANIMATION |
| L | M | M | M | | |

FIG.13

| CONTROL SIGNAL | PARAMETER | F1 : SPORTS | F2 : MUSIC | F3 : STUDIO | F4 : MOVIE | F5 : DRAMA & ANIMATION |
|---|---|---|---|---|---|---|
| Pi | CONTRAST | MEDIUM | HIGH | LOW | HIGH | HIGH |
| | SHARPNESS | LOW | MEDIUM | HIGH | LOW | MEDIUM |
| | 3D NOISE REDUCTION | LOW | MEDIUM | HIGH | LOW | MEDIUM |
| | GAMMA CORRECTION | (linear) | (S-curve) | (concave) | (convex) | (inverse S) |
| Ci | OVERDRIVE | HIGH | HIGH | MEDIUM | MEDIUM | LOW |
| | BACKLIGHT | MEDIUM | HIGH | MEDIUM | LOW | MEDIUM |

VIDEO DISPLAY APPARATUS THAT ADJUSTS VIDEO DISPLAY PARAMETERS BASED ON VIDEO PICTURE TYPE

BACKGROUND OF THE INVENTION

1. Field of the Invention

The present invention relates to a video display apparatus.

2. Description of the Related Art

The following Japanese patent application publications provide examples of conventional video display apparatus.

JP 10-322622 describes a digital television broadcast receiver that receives information indicating the type or genre of a television program and sets different audio and video output parameters for different genres, according to user preferences. The type or genre information is included in program guidance information broadcast by the broadcasting station together with the program data in digital broadcasts, including broadcasts from earth-orbiting satellites.

A problem with this scheme is that the necessary program guidance information is not present in conventional analog broadcasts, and is also missing from recorded programs obtained from an external device such as a digital versatile disc (DVD) device. Another problem is that even when the program guidance information is present, it does not necessarily characterize the entire content of the program. A movie program, for example, may have interspersed commercial segments. Although these segments are quite different in character from the movie content, they are classified by the program guidance information as part of the movie.

JP 2002-520747 discloses a method of characterizing video content by identifying key video frames, creating histograms from the key frames, and classifying the histograms. The purpose, however, is to determine the boundaries between programs in order to construct an index of the video contents, not to adjust video output parameters according to the type of video content. In some cases, the classification scheme would lead to parameters that produce video characteristics inappropriate for the video content.

JP 2004-7301 describes an image processing apparatus that creates a histogram of the luminance signal in an input video signal to derive a relationship between luminance and appearance frequency and modifies the video signal to improve the picture quality, selecting a gradation pattern suitable for the video picture. This scheme, however, does not attempt to classify video content or adjust video output parameters according to such a classification. In some cases, the video display characteristics of the modified video signal are inappropriate for the differing contents of different programs.

SUMMARY OF THE INVENTION

An object of the present invention is to provide a video display apparatus that adjusts video display parameters so as to display a video picture with characteristics suitable for the type of video picture.

Another object of the invention is to provide a video display apparatus that automatically switches video display parameters in such a way that the viewer is not disturbed by changes in picture quality.

The present invention provides a video display apparatus having a luminance information detector that receives a video signal divided into frames, creates a luminance histogram from a frame of a luminance signal derived from the video signal, and generates luminance information from the luminance histogram.

A content classifier classifies the content of the frame according to the luminance information generated by the luminance information detector and generates a first classification value. A content analyzer analyzes the first classification values output by the content classifier for a plurality of frames to obtain a second classification value.

A saturation information detector receives the video signal, creates a color saturation histogram from a color saturation signal derived from the video signal, and generates color saturation information from the color saturation histogram.

A scene change detector detects scene changes in the video signal and generates a scene change detection signal.

A correction controller outputs a video correction signal and a display control signal, based on the second classification value, the scene change detection signal, and the color saturation information.

A video corrector performs a video correction on the video signal, based on the video correction signal.

A display unit displays a video picture according to the corrected video signal output from the video corrector and the display control signal output from the correction controller.

The video display apparatus classifies the content of the video signal according to luminance information derived from the video signal itself, such as maximum gradation information, intermediate gradation information, minimum gradation information, and average gradation information. The video correction and display control parameters are therefore appropriate for the actual video content, even if the type of content changes during a program, or differs from what would be expected from the program title. Changes in the video correction and display control parameters are made automatically, without requiring program guidance information or user intervention, and appear natural because they are made at scene changes.

BRIEF DESCRIPTION OF THE DRAWINGS

In the attached drawings:

FIGS. 8 and 9 show examples of the relation of the frame content classification value Ji output by the content classifier and the maximum luminance decision value D101, the intermediate luminance decision value D102, the minimum luminance information D103, and the average luminance decision value D104;

FIG. 13 shows examples of picture quality settings made by the correction controller in FIG. 1;

DETAILED DESCRIPTION OF THE INVENTION

Figure 1:
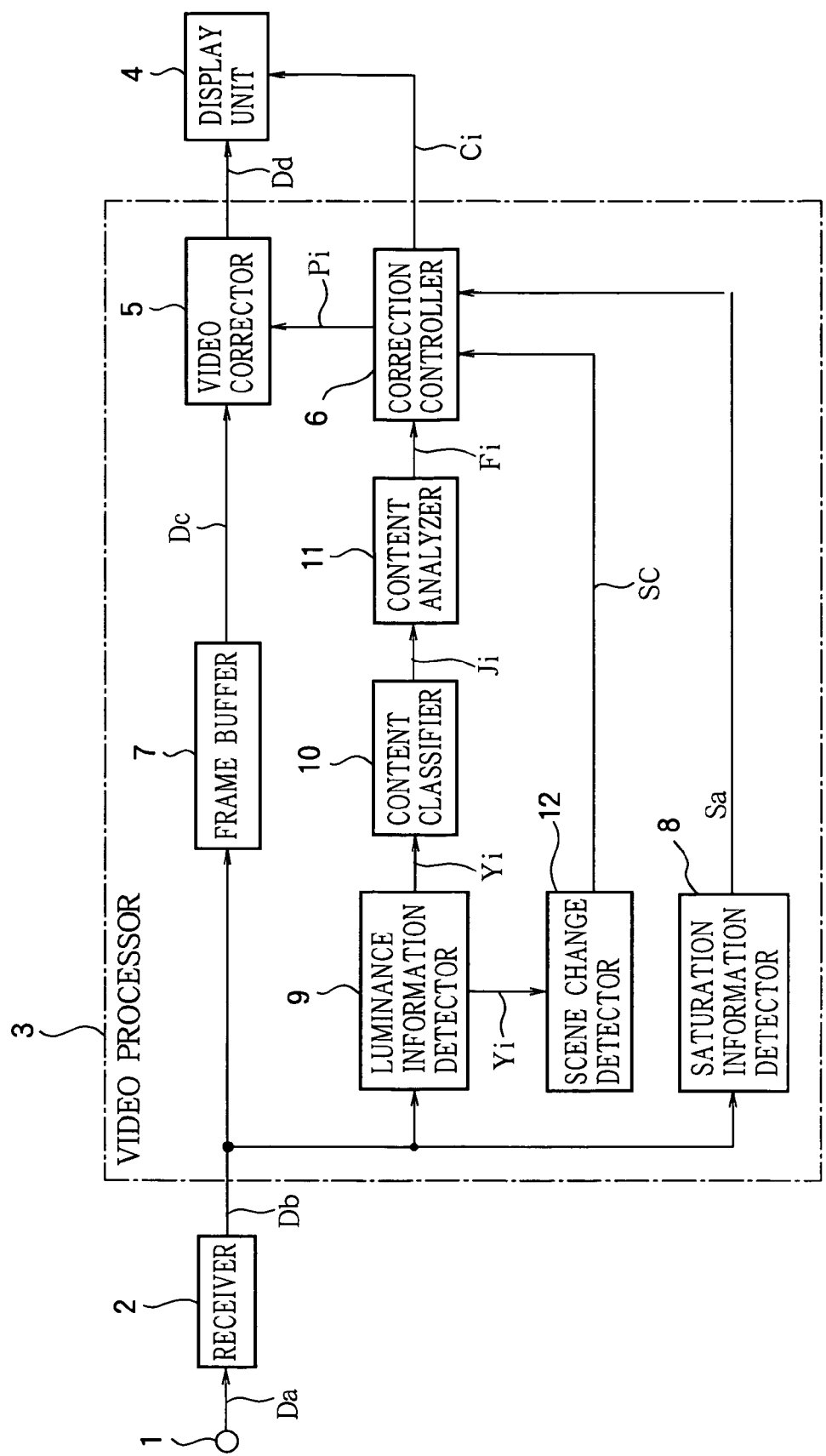
FIG. 1 is a block diagram of a video display apparatus embodying the present invention.

A video display apparatus embodying the invention will now be described with reference to the attached drawings, in which like elements are indicated by like reference characters.

Referring to FIG. 1, the video display apparatus includes an input terminal 1, a receiver 2, a video processor 3, and a display unit 4.

A video signal Da is input at the input terminal 1 in a predetermined format used in television, computers, or the like. The receiver 2 receives the video signal Da input at the input terminal 1, converts it to a format that can be processed by the video processor, and outputs the converted video signal Db. It will be assumed below that the receiver 2 converts the video signal Da to one of several digital video signal formats including a luminance signal Y. If the input video signal Da is an analog signal, the receiver 2 includes an analog-to-digital converter. If the input video signal Da is a digital signal, the receiver 2 includes a device such as a demodulator suitable for the input format.

The video processor 3 includes a video corrector 5, a correction controller 6, a frame buffer 7, a saturation information detector 8, a luminance information detector 9, a content classifier 10, a content analyzer 11, and a scene change detector 12. The video signal Db output from the receiver 2 is input to the frame buffer 7, saturation information detector 8, and luminance information detector 9.

The frame buffer 7 has memory space for storing one or more frames of the video signal Db, and outputs a video signal Dc delayed by a period of one or more frames to the video corrector 5.

The luminance information detector 9 receives the luminance signal Y included in the video signal Db output from the receiver 2 and derives luminance information Yi from the luminance values of the pixels in one frame of the luminance signal Y. The detected luminance information Yi is output to the content classifier 10 and scene change detector 12.

The content classifier 10 classifies the content of each frame according to the luminance information Yi output from the luminance information detector 9 and outputs a frame content classification value Ji to the content analyzer 11.

The content analyzer 11 analyzes the frame content classification values Ji obtained from a sequence of frames, finds a dominant classification value, and outputs it to the correction controller 6 as a frame sequence classification value Fi, indicating a most likely classification result.

The scene change detector 12 detects scene changes, according to the luminance information Yi output from the luminance information detector 9. If a scene change occurs, a scene change detection signal SC is generated (asserted) and output to the correction controller 6.

The saturation information detector 8 receives color difference signals Cb, Cr included in the video signal Db output from the receiver 2 and generates color saturation information Sa. The color saturation information Sa is generated, for example, as follows. First, using the color difference signals Cb, Cr, a color saturation value C for each pixel is obtained by, for example, the following calculation.

$$C=\sqrt{Cb^2+Cr^2}$$

Alternatively, if the video signal Db has a red-green-blue (RGB) format, the color saturation value C may be obtained from color difference components calculated by a known matrix calculation. The color saturation value C may also be obtained from the maximum and minimum values of the red, green, and blue signals.

The saturation information detector 8 then analyzes the color saturation values C over one frame or a plurality of frames to obtain the color saturation information Sa. For example, the saturation information detector 8 may create a histogram of the color saturation value of the pixels in one frame or a plurality of frames and obtain a maximum value, an average value, or a minimum value for use as the color saturation information Sa. Alternatively, instead of creating a histogram from a plurality of frames, the saturation information detector 8 may create one histogram for each frame, obtain a maximum value, an average value, or a minimum value from each histogram, and derive the color saturation information Sa from the values obtained over a plurality of frames.

The saturation information detector 8 outputs the color saturation information Sa to the correction controller 6.

When the scene change detection signal SC is asserted, the correction controller 6 outputs a video correction control signal Pi, corresponding to a content classification based on the frame sequence classification value Fi and the color saturation information Sa, to the video corrector 5, and outputs a display control signal Ci, based on the frame sequence classification signal Fi, to the display unit 4.

The video corrector 5 performs a video correction on the video signal Dc, based on the video correction control signal Pi, and outputs the corrected signal to the display unit 4 as a video signal Dd.

The display unit 4 displays a video picture according to the video signal Dd as corrected by the video corrector 5 and performs display control according to the display control signal Ci. The display unit 4 may be, for example, a liquid crystal display, a digital micromirror device (DMD) display, an electroluminescence (EL) or organic light-emitting diode (OLED) display, a plasma display, or a cathode-ray tube (CRT) display; more generally, the display unit 4 may be any display of the reflection type, transmission type, or self-emitting type.

Figure 2:
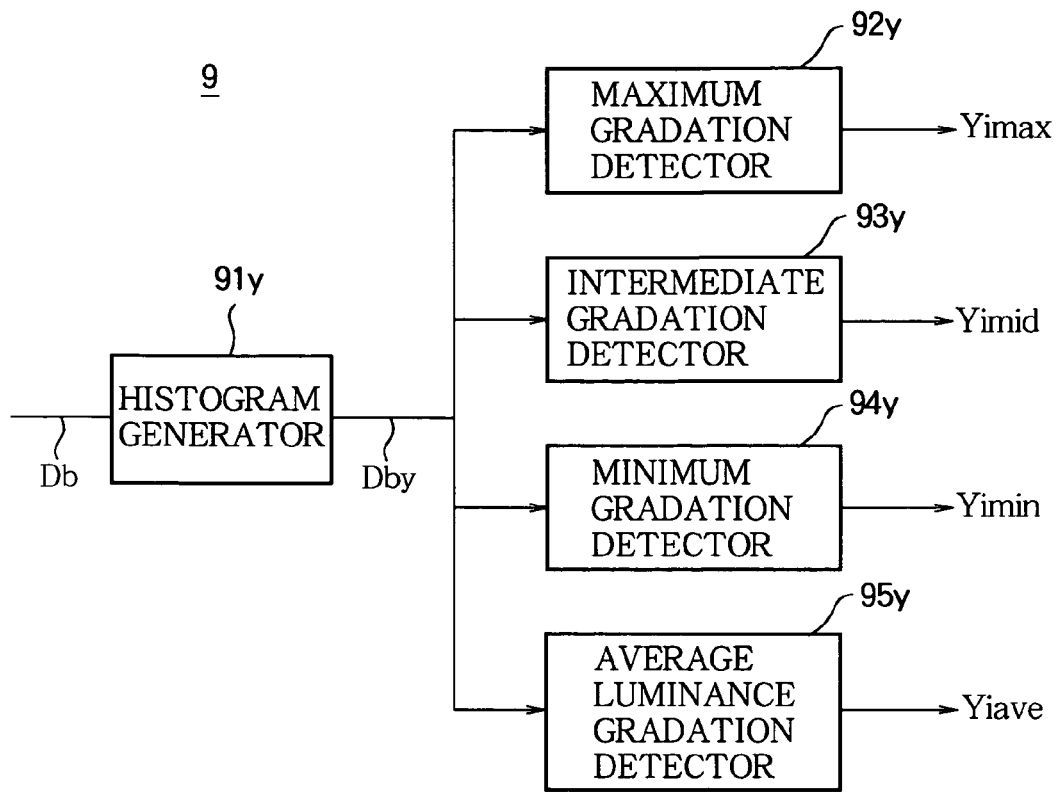
FIG. 2 is a block diagram showing an example of the internal structure of the luminance information detector in FIG. 1.

Referring to FIG. 2, the luminance information detector 9 includes, in this embodiment, a histogram generator $91y$, a maximum gradation detector $92y$, an intermediate gradation detector $93y$, a minimum gradation detector $94y$, and an average luminance gradation detector $95y$, and detects a maximum gradation, an intermediate gradation, a minimum gradation, and an average luminance. In other possible embodiments, the luminance information detector 9 is not limited to detecting these four values, but detects other values as well. Conversely, fewer than four values may be detected, to simplify the luminance information detector 9.

The luminance information detector 9 receives a luminance signal Y included in the video signal Db output from the receiver 2 and creates a histogram Dby of the luminance signal Y from one frame of the video signal Db.

If the received video signal Db is interlaced, since two interlaced fields make up one frame, the luminance information detector 9 creates a histogram of the luminance signal Y by treating two fields of the video signal as one frame.

When the video signal Db is received in the RGB format, the luminance (Y) component may be calculated by a known matrix calculation and then input to the histogram generator 91$y$. Alternatively, to simplify the circuitry, one of the three primary color signals, say the green (G) signal, may be used as the luminance signal Y.

In creating a histogram of the luminance signal Y from one frame of the video signal Db, the luminance information detector 9 may limit the histogram data to the effective picture area in the frame. The process of changing the picture quality correction parameters to be used in the next frame needs to be finished within the vertical blanking interval, so that it is preferable for the luminance information to be output immediately at the end of the effective picture interval. Since black (zero gradation) is displayed during the vertical blanking interval, if histogram data are accumulated during the vertical blanking interval, the values derived from the histogram will have a black bias. In some cases, the vertical blanking interval includes superimposed digital information such as teletext, which may also distort the histogram.

The maximum gradation detector 92$y$ detects a maximum luminance gradation value in one frame of the video signal Db from the histogram generated in the histogram generator 91$y$ and outputs it as maximum gradation information Yimax.

The intermediate gradation detector 93$y$ detects an intermediate luminance gradation value in the one frame of the video signal Db from the histogram generated in the histogram generator 91$y$ and outputs it as intermediate gradation information Yimid.

The minimum gradation detector 94$y$ detects a minimum luminance gradation value in the one frame of the video signal Db from the histogram generated in the histogram generator 91$y$ and outputs it as minimum gradation information Yimin.

The average luminance gradation detector 95$y$ detects an average luminance gradation value in the one frame of the video signal Db from the histogram generated in the histogram generator 91$y$ and outputs it as average gradation information Yiave.

The term 'maximum gradation information' is used herein to mean either the maximum luminance gradation value or a related value detected by a predetermined rule. The term 'intermediate gradation information' may mean any intermediate luminance gradation value detected by a predetermined rule; a median value is one example. The term 'minimum gradation information' means the minimum luminance gradation value or a related value detected by a predetermined rule. The term 'average gradation information' means the average gradation value or a related value detected by a predetermined rule. Further details will be given below.

Figure 3:
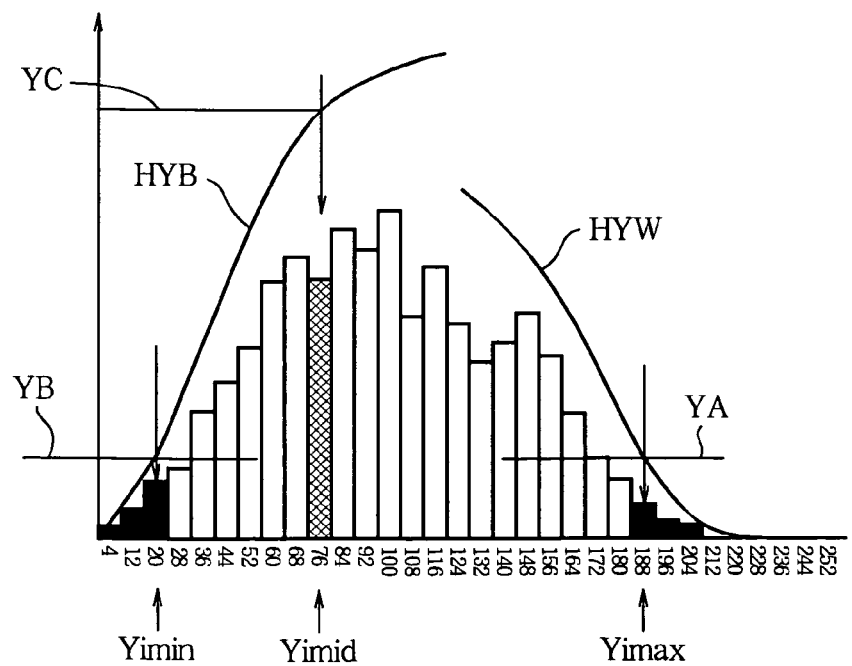
FIG. 3 shows an exemplary histogram generated by the histogram generator in FIG. 2 and indicates the conditions for generating luminance gradation values.

FIG. 3 shows an exemplary histogram generated by the histogram generator 91$y$. In FIG. 3, the horizontal axis represents the representative value of a region or 'class' including a plurality of gradation values, and the vertical axis represents the frequency with which pixels in each class appear in one frame, that is, the number of pixels having gradation values belonging to each class.

In the following description, it is assumed that the luminance component Y of the video signal Db has an eight-bit data width and that there are 256 gradation levels, ranging from 0 to 255. This is not a restriction, however; the gradation values in the video signal Db may have any number of bits, for example, ten bits or six bits, instead of eight bits.

In FIG. 3, the histogram generator 91$y$ divides the 256 gradation levels at intervals of 8 gradation levels into 32 regions, each of which is defined as a class of the histogram. A value close to the center of each class is defined as the representative value of the class. If the central value is an integer, the central value itself may be used as the representative value. If the central value is not an integer, the closest greater integer may be used as the representative value. For example, the central value of the class comprising gradation levels 0 to 7 is 3.5, so the representative value of the class is 4. The numbers on the horizontal axis in FIG. 3 indicate the representative values of the respective classes.

When the central value of a class is not an integer but a number with a fraction part, as in the present embodiment, the central value, including the fraction part, may be employed as the representative value, but using an integer close to the central value as in the example above has the advantage of reducing the amount of calculation.

As described above, the histogram generator 91$y$ in the present embodiment defines classes as regions including eight consecutive gradation levels, so each class frequency in the histogram in FIG. 3 is the sum of the number of occurrences of eight gradation values. The frequency corresponding to number 4 on the horizontal axis, for example, is the number of pixels having gradation values from 0 to 7 in one frame of the luminance signal Db.

Alternatively, a histogram different from the one in FIG. 3 may be created by counting the frequency of each gradation level individually. That is, each class may comprise a single gradation level. In this case, the representative value of each class is the gradation level constituting the class.

In the above example, 256 gradation levels are divided at constant intervals of 8 gradation levels to form 32 classes, but the number of classes may be a number other than 32, and the width of the class intervals need not be constant. Any class scheme may be used. By way of example, when there are 256 gradation levels, the gradation levels from 0 to 32 and from 200 to 255 may be divided into classes at intervals of 4 gradation levels, and the remaining gradation levels may be divided into classes at intervals of 24 gradation levels. This enables the amount of calculation to be reduced and the minimum and maximum gradation values to be determined more precisely.

The maximum gradation detector 92$y$ adds up the frequencies, proceeding cumulatively from the maximum class toward the minimum class in the histogram created as described above, extracts the representative value of the class at which the resulting cumulative frequency HYW first exceeds a predetermined threshold value YA (for example, a value corresponding to 10% of the total number of pixels), and outputs the extracted value as the maximum gradation information Yimax. This gives substantially the same result as the following procedure: the maximum gradation detector 92$y$ adds up the frequencies, proceeding cumulatively from the minimum class toward the maximum class, extracts the representative value of the class at which the resulting cumulative frequency HYB first exceeds a value obtained by subtracting the above threshold value YA from the total number of pixels (for example, a value corresponding to 90% of the total number of pixels), and outputs the extracted value as the maximum gradation information Yimax.

The minimum gradation detector 94$y$ adds up the frequencies, proceeding cumulatively from the minimum class toward the maximum class in the histogram created by the histogram generator 91$y$, extracts the representative value of a class at which the cumulative frequency HYB first exceeds a predetermined threshold value YB (for example, a value corresponding to 10% of the total number of pixels), and outputs the extracted value as the minimum gradation information Yimin.

The intermediate gradation detector 93y adds up the frequencies, proceeding cumulatively from the minimum class toward the maximum class in the histogram created as described above, extracts the representative value of the class at which the cumulative frequency HYB first exceeds a predetermined threshold value YC (for example, a value corresponding to half the total number of pixels), and outputs the extracted representative value as the intermediate gradation information Yimid. The intermediate gradation may also be detected by proceeding from the maximum class toward the minimum class, using the HYW cumulative frequency. When the threshold value YC is set to half of the total number of pixels, HYB and HYW are equally efficient.

In the histogram shown in FIG. 3, since the cumulative frequency HYW first exceeds the threshold value YA at the class with a representative value of 188, the maximum gradation information Yimax is 188. In this case, the maximum gradation information Yimax is not the maximum gradation level (which occurs in the class with representative value 204) in the Db signal frame but is a related value detected using the cumulative frequency HYW and the threshold value YA.

In FIG. 3, since the cumulative frequency HYB first exceeds the threshold value YB at a representative class value of 20, this number (20) becomes the minimum gradation information Yimin. In this case, the minimum gradation information Yimin is not the minimum gradation level in one frame of the video signal Db but is a related value detected using the cumulative frequency HYB and the threshold value YB.

To simplify the processing, the thresholds YA and YV may be set to 0%, so that the maximum and minimum gradation levels themselves are used as the maximum gradation information and minimum gradation information.

Since the cumulative frequency HYB first exceeds the threshold value YC at class with a representative value of 76, this value (76) or a corresponding value becomes the intermediate gradation information Yimid. This intermediate gradation information Yimid represents a gradation level at which the cumulative frequency reaches a predetermined proportion, such as one-third or one-half, of the total number of pixels in one frame of the video signal Db.

The average luminance gradation detector 95y calculates the average gradation value in one frame of the luminance signal Y from the luminance signal included in the video signal Db and outputs corresponding average gradation information Yiave. Specifically, if a luminance signal gradation level is denoted by Yi and the number of pixels having this luminance signal gradation level by nYi, the average gradation value is calculated by the following equation (1).

$$\text{average gradation value} = \Sigma(Yi \times nYi)/\Sigma nYi \quad (1)$$

The average gradation value itself may be output as the average gradation information Yiave, or the representative value of the class including the average gradation value may be output as Yiave.

In this example, the cumulative frequencies HYW, HYB and other values are created in the histogram generator 91y, but these values may also be created in the maximum gradation detector 92y, intermediate gradation detector 93y, minimum gradation detector 94y, and average luminance gradation detector 95y.

As noted above, the histogram classes need not be spaced at equal intervals. The class intervals may be set arbitrarily, and the method of dividing the gradation scale into classes may be determined according to the content characteristics to be detected.

Figure 4:
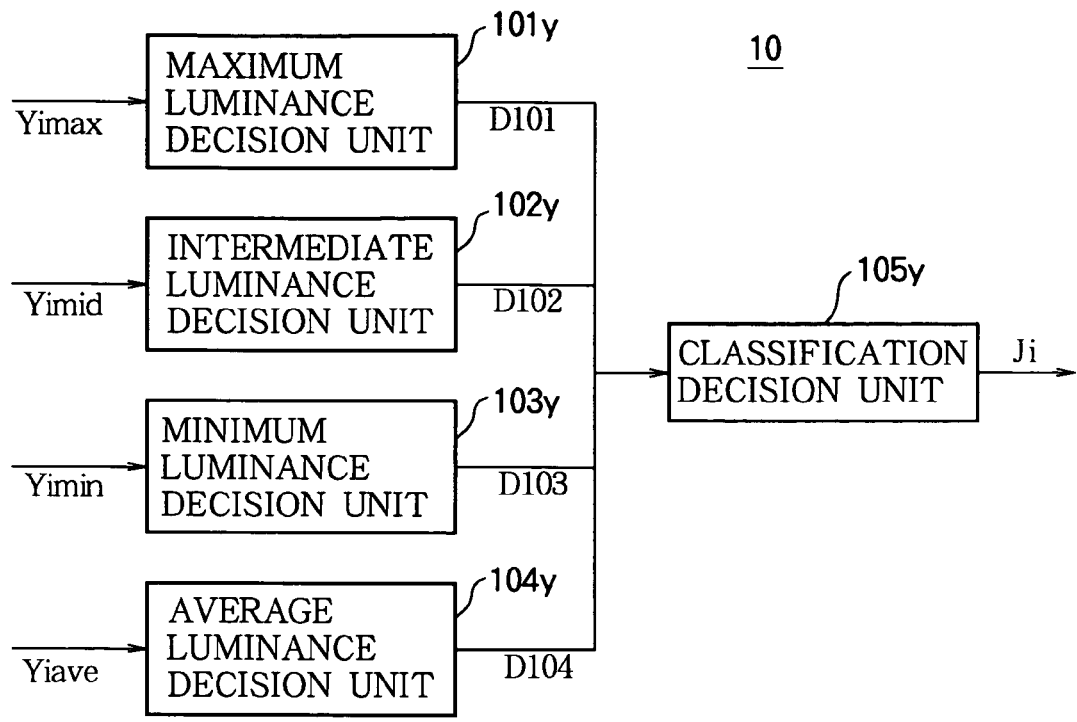
FIG. 4 is a block diagram showing an example of the internal structure of the content classifier in FIG. 1.

Referring to FIG. 4, the content classifier 10 includes, for example, a maximum luminance decision unit 101y, an intermediate luminance decision unit 102y, a minimum luminance decision unit 103y, an average luminance decision unit 104y, and a classification decision unit 105y.

The maximum gradation information Yimax output from the luminance information detector 9 is input to the maximum luminance decision unit 110y, the intermediate gradation information Yimid is input to the intermediate luminance decision unit 102y, the minimum gradation information Yimin is input to the minimum luminance decision unit 103y, and the average gradation information Yiave is input to the 104y.

The maximum luminance decision unit 101y classifies the maximum luminance magnitude on the basis of the maximum gradation information Yimax and outputs the result of this classification as a maximum luminance decision value D101.

The intermediate luminance decision unit 102y classifies the intermediate luminance magnitude on the basis of the intermediate gradation information Yimid and outputs the result of this classification as an intermediate luminance decision value D102.

The minimum luminance decision unit 103y classifies the minimum luminance magnitude on the basis of the minimum gradation information Yimin and outputs the result of this classification as a minimum luminance decision value D103.

The average luminance decision unit 104y classifies the average luminance magnitude on the basis of the average gradation information Yiave and outputs the result of this classification as an average luminance decision value D104.

Figure 5:
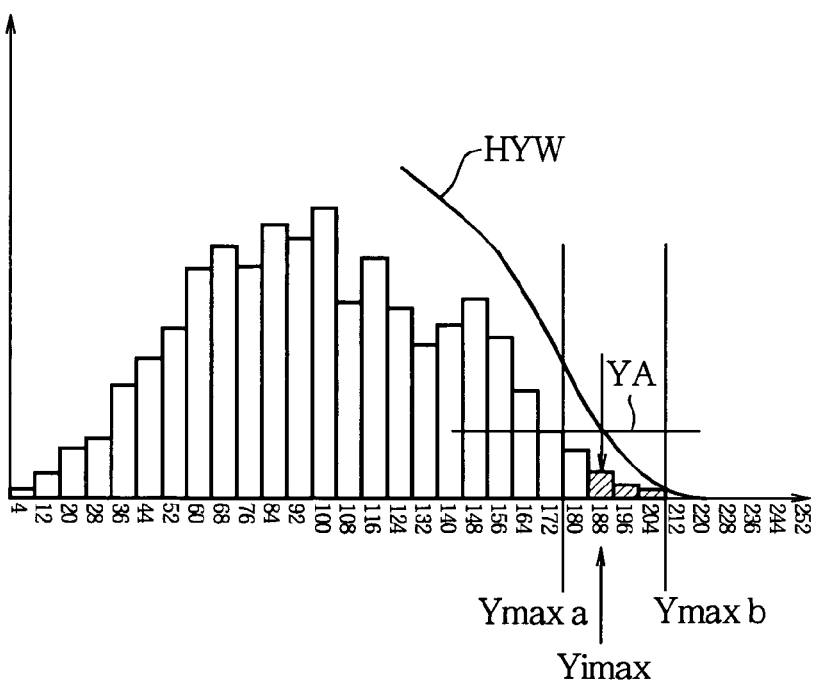
FIG. 5 indicates the conditions by which the maximum luminance decision unit in FIG. 4 generates the maximum luminance decision value D101.

Specifically, as shown in FIG. 5, the maximum luminance decision unit 101y decides whether the maximum gradation information Yimax is less than a predetermined first maximum luminance decision threshold Ymaxa, between the first maximum luminance decision threshold Ymaxa and a predetermined second maximum luminance decision threshold Ymaxb, or greater than the second maximum luminance decision threshold Ymaxb, the second maximum luminance decision threshold Ymaxb being greater than the first maximum luminance decision threshold Ymaxa. One of three decision values, Yimax-small, Yimax-medium, and Yimax-large, is then output to the classification decision unit 105y as the maximum luminance decision value D101. In the example shown in FIG. 5, since the maximum gradation information Yimax is between the first maximum luminance decision threshold Ymaxa and the second maximum luminance decision threshold Ymaxb, the Yimax-medium decision value is output to the classification decision unit 105y.

Figure 6:
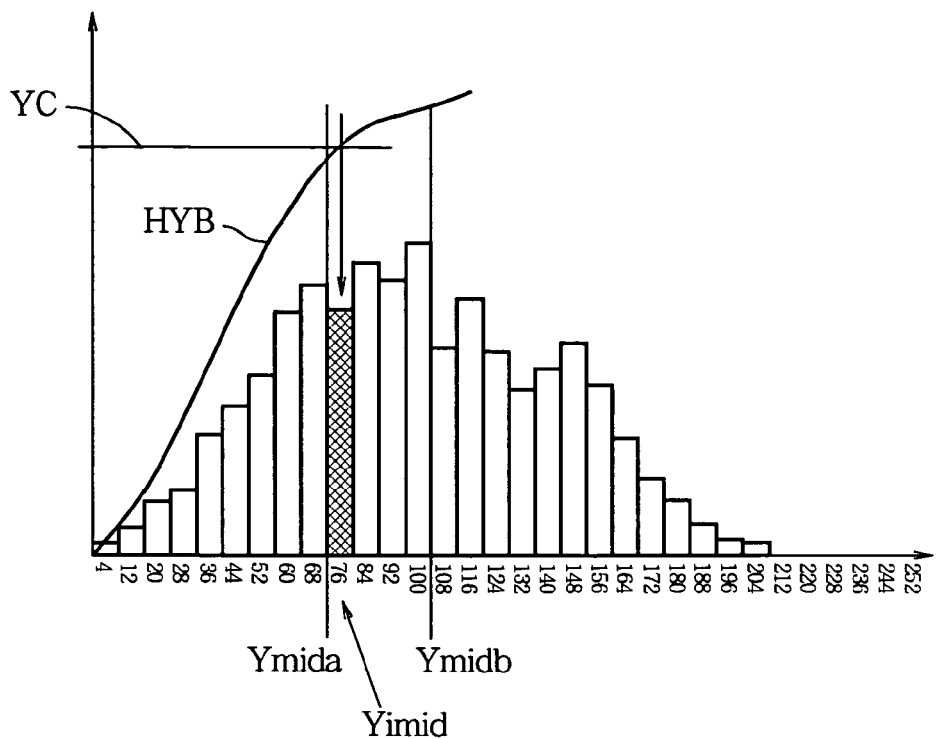
FIG. 6 indicates the conditions by which the intermediate luminance decision unit in FIG. 4 generates the intermediate luminance decision value D102.

The intermediate luminance decision unit 102y decides, as shown in FIG. 6, whether the intermediate gradation information Yimid is less than a predetermined first intermediate luminance decision threshold Ymida, between the first intermediate luminance decision threshold Ymida and a predetermined second intermediate luminance decision threshold Ymidb, or greater than the second intermediate luminance decision threshold Ymidb, the second intermediate luminance decision threshold Ymidb being greater than the first intermediate luminance decision threshold Ymida. One of three decision values, Yimid-small, Yimid-medium, and Yimid-large, is then output to the classification decision unit 105y as the intermediate luminance decision value D102. In the example shown in FIG. 6, since the intermediate gradation information Yimid is between the first intermediate luminance decision threshold Ymida and the second intermediate luminance decision threshold Ymidb, the Yimid-medium decision value is output to the classification decision unit 105y.

Figure 7:
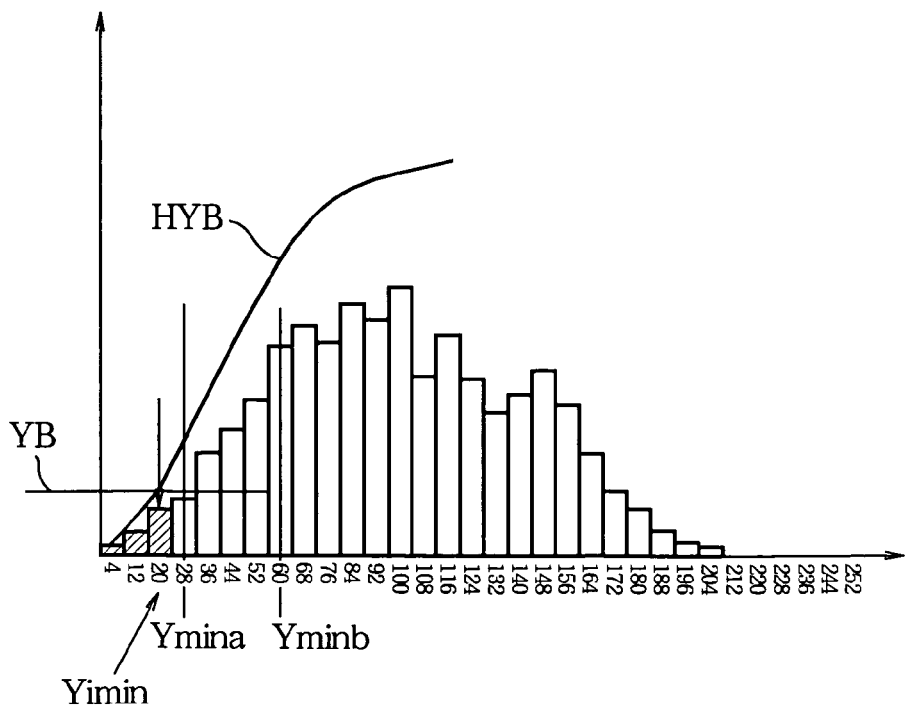
FIG. 7 indicates the conditions by which the minimum luminance decision unit in FIG. 4 generates the minimum luminance decision value D103.

The minimum luminance decision unit 103y decides, as shown in FIG. 7, whether the minimum gradation information Yimin is less than a predetermined first minimum luminance decision threshold Ymina, between the first minimum luminance decision threshold Ymina and a predetermined second minimum luminance decision threshold Yminb, or greater than the second minimum luminance decision threshold Yminb, the second minimum luminance decision threshold Yminb being greater than the first minimum luminance decision threshold Ymina. One of three decision values, Yimin-small, Yimin-medium, and Yimin-large, is then output to the classification decision unit 105y as the minimum luminance decision value D103. In the example shown in FIG. 7, since the minimum gradation information Yimin is less than the first minimum luminance decision threshold Ymina, the Yimin-small decision value is output to the classification decision unit 105y.

The average luminance decision unit 104y decides whether the average gradation information Yiave calculated by the above equation (1) is less than a predetermined first average luminance decision threshold Yavea, between the first average luminance decision threshold Yavea and a predetermined second average luminance decision threshold Yaveb, or greater than the second average luminance decision threshold Yaveb, the second average luminance decision threshold Yaveb being greater than the first average luminance decision threshold Yavea. One of three decision values, Yiave-small, Yiave-medium, and Yiave-large, is then output to the classification decision unit 105y as the average luminance decision value D104.

The classification decision unit 105y determines the type of content (classifies the content) according to the four decision values D101, D102, D103, D104 and outputs the result (classification).

As described above, since it is possible for each of the four decision values D101, D102, D103, D104 to have one of the three values 'small', 'medium', and 'large', there are 3×3×3×3=81 combinations of the four decision values, enabling content to be classified into up to 81 categories. FIG. 8 shows these 81 combinations and the corresponding classification information, designated by frame content classification values J1 to J81, using the letters S, M, and L to denote 'small', 'medium', and 'large'.

FIG. 9 shows another classification scheme in which content is classified into five categories (types), designated J1 to J5, on the basis of the combinations of the four decision values. Each category is detected when the four decision values have any of the combinations of values indicated in the columns to the left. For example, the genre designated Ji is detected when D104 indicates 'small' (S), D103 indicates 'medium' (M), D102 indicates 'large' (L), and D101 indicates 'medium' (M), as in the first row; when D101-D104 all indicate 'medium' (M), which is one combination in the second row; and for various other combinations in the second row and the rows below.

The 'program genre' column at the right end of the table in FIG. 9 indicates program genres in which frames of types Ji to J5 are found to appear frequently. For example, frames of type J1 occur frequently in sports programs.

The 'sports' genre (J1) includes sports programs and other programs with much natural scenery. The green grass of a soccer field or baseball field tends to produce a Gaussian histogram distribution, or sometimes a substantially uniform distribution extending evenly over all gradation levels.

The 'music' genre (J2) includes popular song programs and music clips. This type of program includes many scenes with strong bright-dark contrasts, which produce histogram distributions with high frequency counts in the classes near the white and black ends.

The 'studio' genre (J3) includes variety shows and news programs, which are mostly photographed in a television studio. This type of program has a high average luminance and is frequently characterized by a luminance distribution biased toward white.

The 'movie' genre (J4) is characterized by frequent dark scenes with a luminance distribution biased toward black.

The 'drama and animation' genre (J5) includes acted and animated dramas. Programs of these types often have histogram distributions with little black but with high frequency values in low luminance classes.

The program genres in FIG. 9 are names applied for convenience and do not necessarily correspond to the broadcaster's classification of a program. A movie with a sports theme, for example, might show the characteristics of the 'sports' genre (J1) rather than the 'movie' genre (J4). A classification like the one shown in FIG. 9 only indicates a tendency of frames of each type to appear most often in programs of the indicated genre.

The classification decision unit 105y is not restricted to classifying content according to the four decision values D101, D102, D103, D104 given above. In an alternative embodiment, the classification decision unit 105y may use only three, or fewer, of the above four decision values. For example, content may be classified according only to the average luminance decision value D104, or according to the average luminance decision value D104 and the maximum luminance decision value D101. The information used for the classification is a design choice. Reducing the amount of information on which the classification is based can speed up the classification process and reduce the memory requirement.

Similarly, the values need not be ranked on three levels as 'large', 'medium', or 'small'; the ranking scale may have any number of levels.

In order to complete the process of changing the picture quality correction parameters within the vertical blanking interval, the content classifier 10 should output a classification result (Ji value) promptly, as soon as possible after the luminance information detector 9 outputs the luminance information Yi at the end of the effective picture interval in each frame, before the start of the effective picture interval in the next frame.

In order to increase the accuracy of the classification process, the classification process may also make use of a classification result obtained by a film source detection unit provided in a known interlaced-progressive (IP) conversion circuit, for example, or of genre information in the digital program table described in JP 10-322622.

As described above, from the luminance histogram of the video signal of each frame, the content classifier 10 generates a value Ji that classifies the frame and indicates the type of content in which that type of frame tends to appear.

The content analyzer 11 analyzes the frame content classification values Ji of a plurality of consecutive frames to generate a frame sequence classification value Fi, which is output to the correction controller 6.

The frame sequence classification value Fi has the same range of values as the frame content classification value Ji. In FIG. 8, for example, when the suffix i of Ji takes values from 1 to 81, the suffix i of Fi also takes values from 1 to 81.

Similarly, in FIG. 9, where the suffix i of Ji takes values from 1 to 5, the suffix i of Fi also takes values from 1 to 5.

When a specific suffix (i), e.g., a specific value from 1 to 5, occurs more frequently or consistently more frequently than the other suffixes in the analyzed frame content classification values (Ji), the content analyzer 11 generates a frame sequence classification value Fi with the same suffix i.

This analysis makes it possible to generate information (Fi) representing a classification result (determination of content type) that is more accurate and more stable than the frame content classification values Ji generated from individual frame data.

The analysis may be performed by various methods. Specific examples are described below, assuming a five-type classification as shown in FIG. 9.

In one exemplary method (referred to below as the first method), the content analyzer 11 monitors the sequentially received frame content classification values Ji, and as soon as any one Ji value (i=x) has occurred a predetermined number (N) of times, generates the corresponding frame sequence classification value Fi (i=x). That is, the first frame content classification value to appear in N frames is detected as the program type.

Figure 10:
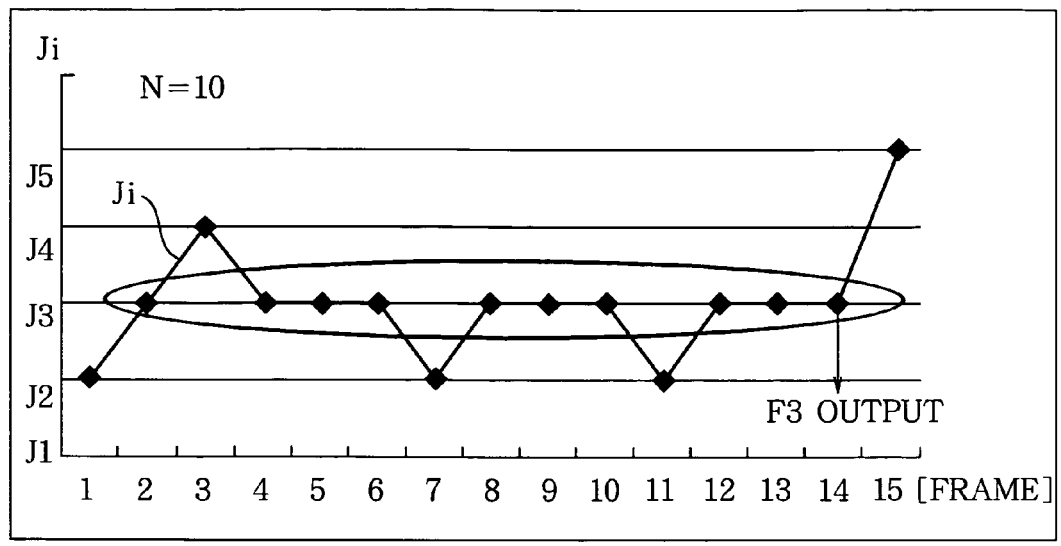
FIGS. 10, 11, and 12 illustrate three methods by which the content analyzer may classify contents according to the classifications of a plurality of frames.

For example, if the predetermined number N is set to ten, the frame content classification results are monitored until some value has appeared ten times. In FIG. 10, the first frame content classification value to appear ten times is J3, so the corresponding frame sequence classification value F3 is generated and output.

In the first method, since the first frame content classification value Ji to be obtained N times is used as the frame sequence classification value Fi, if N is not too small and not too large, an accurate frame sequence classification value Fi can be obtained relatively quickly.

In another exemplary method (the second method), the content analyzer 11 monitors sequentially received frame content classification values Ji until some Ji value (i=x) occurs a predetermined number (M) of times consecutively, and then generates the corresponding frame sequence classification value Fi (i=x). That is, the first frame content classification value to appear in M consecutive frames is detected as the program type.

Figure 11:
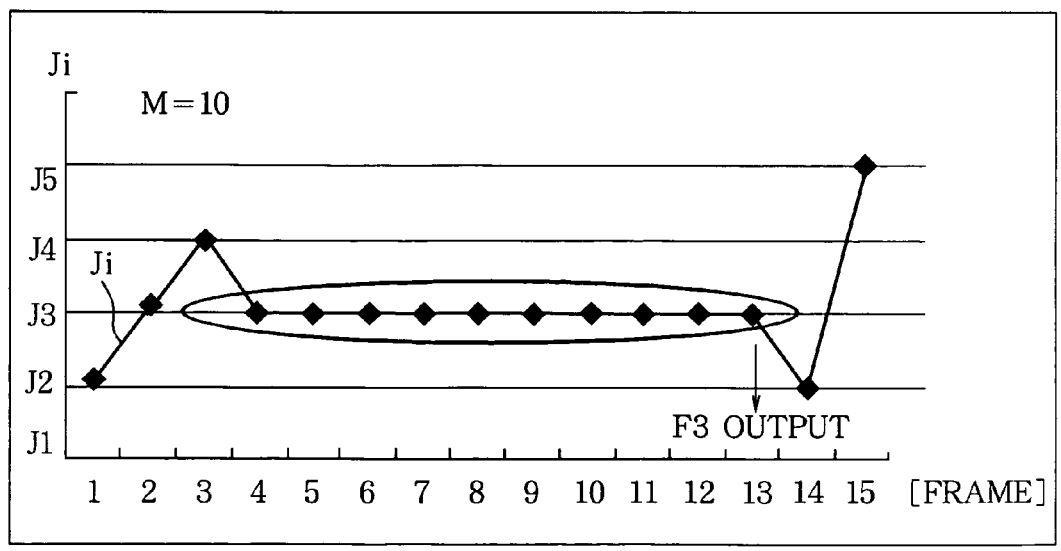

For example, if the predetermined number M is set to ten, the frame content classification results are monitored until some value has appeared ten times consecutively. In FIG. 11, the first frame content classification value to appear ten times consecutively is J3, which occurs from the fourth frame to the thirteenth frame, so the corresponding frame sequence classification value F3 is generated and output at the thirteenth frame.

Compared with the first method, the second method, by requiring the same Ji value to appear in M consecutive frames, produces a more accurate frame sequence classification value Fi, but the analysis process may take longer.

In yet another exemplary method (the third method), the content analyzer 11 finds the frame content classification value Ji (i=x) that occurs most frequently among K sequentially input frame content classification values Ji, where K is a predetermined positive integer, and generates the corresponding frame sequence classification value Fi (i=x). That is, the frame content classification value that appears most frequently among K consecutive frames is detected as the program type.

Figure 12:
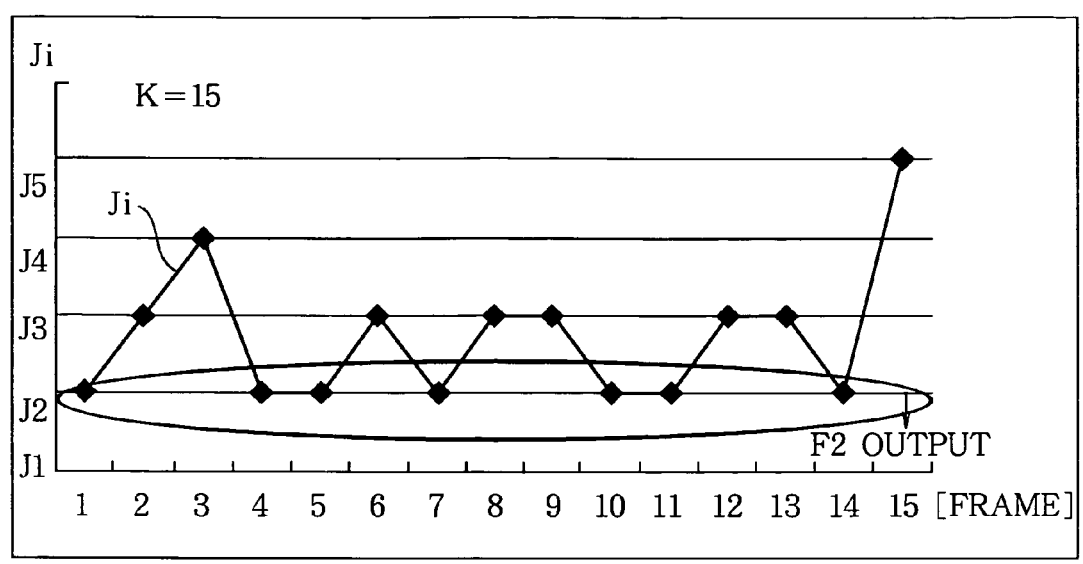

For example, if the above predetermined positive integer K is set to fifteen, then fifteen consecutive frames are monitored. In the fifteen frames in FIG. 12, frame content classification value J1 does not occur at all, J2 occurs seven times, J3 occurs six times, and J4 and J5 occur once each, so the frame sequence classification value F2, corresponding to the most frequent frame content classification value (J2), is generated and output.

The third method produces an accurate frame sequence classification value Fi in the predetermined number (K) of frames.

The above content analyzer 11 may also determine the frame sequence classification values by a combination of the above three methods.

For example, the first and second methods may be combined by waiting until some frame content classification value Ji (i=x) occurs Na times, then waiting for a new string of Nb consecutive occurrences of this same value Ji (i=x), where Na and Nb are predetermined numbers, and generating the corresponding frame sequence classification value Fi (i=x) at the end of the Nb consecutive occurrences of frame content classification value Ji.

In another possible combined method, the content analyzer 11 monitors the frame content classification values until some frame content classification value Ji occurs Na times, remembers the result (Ji), then begins monitoring again in the same way, repeats this procedure until some result Ji (i=x) has been obtained Nb times, and then generates the corresponding frame sequence classification value Fi (i=x). In other words, the first frame content classification value Ji to be the first frame content classification value to appear in Na frames Nb times is detected as the program type. This method can be regarded as a double application of the first method above.

The combinations described above provide great flexibility in adjusting the accuracy of the frame sequence classification value Fi and the time required to obtain it.

In order to complete the process of changing the picture quality correction parameters within the vertical blanking interval, the content analyzer 11 should complete its monitoring activities within the vertical blanking interval at the end of each frame, and when it obtains a frame sequence classification result (Fi value), it should output by result promptly, before the next effective picture interval begins.

During the initial frames of the input video signal, the frame sequence classification value Fi is indefinite, so the frame content classification value Ji determined from each single frame by the content classifier 10 may be used as the frame sequence classification value Fi.

The effect of the content analyzer 11 in the present embodiment is to ignore transitory changes in program content, such as an isolated frame that is atypical of the program genre, thereby preventing the picture quality correction parameters from being changed in response to a type of frame that appears briefly, then disappears. When the frame classification changes frequently, the content analyzer 11 prevents these changes from causing equally frequent changes in the picture quality correction parameters, which would look unnatural.

The method used by the content analyzer 11 to classify video content accurately from the characteristics of a plurality of frames is applicable not only to video display apparatus but also to other types of video apparatus, including, for example, apparatus that records video signals on hard disks, DVDs, and other media.

For certain purposes, the content analyzer 11 may be configured to output the frame content classification value Ji of each frame as the frame sequence classification value Fi, without waiting to monitor a plurality of frames. That is, the content analyzer 11 may be omitted, and the frame content classification value Ji may be output from the content classifier 10 directly to the correction controller 6 in place of the frame sequence classification value Fi. Optimized picture quality corrections can then be performed in real time.

From the frame sequence classification value Fi and the color saturation information Sa, the correction controller 6 generates a video correction control signal Pi suitable for the video content and outputs it to the video corrector 5 when the next scene change detection signal SC is output. The correction controller 6 also generates a display control signal Ci corresponding to the frame sequence classification value Fi and outputs it to the display unit 4 at the same timing. Even if the frame sequence classification value Fi and the color saturation information Sa change, the correction controller 6 does not output a new video correction control signal Pi and display control signal Ci until a scene change detection signal SC is received.

The frame sequence classification value Fi is obtained on the basis of information from a plurality of frames, which takes time. The same is true of the color saturation information Sa, so the generation of the Fi and Sa values is not in general synchronized with the timing of scene changes. An abrupt change in picture quality during a continuous scene, however, would look strange. By changing the picture quality parameters only when a scene change is detected, the correction controller 6 is able to make the change in picture quality characteristics appear natural.

The correction controller 6 preferably outputs the video correction control signal Pi and display control signal Ci within the vertical blanking interval in synchronization with the scene change detection signal SC, so that the change of the video correction parameters can be completed before the start of the effective picture interval in the next frame.

FIG. 13 shows examples of the control parameters output from the correction controller 6 in correspondence to the frame sequence classification values F1 to F5 created by the content analyzer 11. These control parameters are included in the video correction control signal Pi and the display control signal Ci.

The parameters illustrated in FIG. 13 concern the luminance component of the video signal, which is the component from which the contents are classified, but it is also possible to control non-luminance characteristics according to the detected content classification. The control scheme may be based on known characteristics or tendencies of different program genres, or on user preferences or system considerations.

The luminance control scheme illustrated in FIG. 13 may also be modified according to user preferences or system considerations.

The luminance parameters controlled by the video correction control signal Pi output to the video corrector 5 from the correction controller 6 according to the frame sequence classification value Fi include contrast, sharpness, three-dimensional (3D) noise reduction, and a gamma correction. The gamma correction is a remapping of the luminance scale according to an arbitrary input-output curve; 3D noise reduction is a noise reduction process that operates in the temporal dimension as well as two spatial dimensions. The luminance parameters included in the display control signal Ci output from the correction controller 6 to the display unit 4 include, in the case of a liquid crystal display, for example, backlight brightness and overdrive. Overdrive is a technique that enhances the motion response of a liquid crystal display. If the video display apparatus in the present embodiment is, for example, a television receiver equipped with an audio output unit (not shown), audio adjustments suitable for different content characteristics and genres may also be performed.

The terms 'high', 'medium', and 'low' in FIG. 13 are relative: for example, 'low' may indicate that a parameter is equal to or less than a first threshold value, 'medium' may indicate that the parameter is greater than the first threshold value and equal to or less than a second threshold value, and 'high' may indicate that the parameter is greater than the second threshold value.

In the exemplary scheme in FIG. 13, since the 'sports' genre (F1) is characterized by half-tone shades spread evenly across all gradation levels, a linear gamma correction is used, and the contrast and backlight brightness parameters are set to 'medium'. Because of the prevalence of natural scenery, sharpness is set to 'low'. Because of the vigorous motion common in sports programs, the overdrive parameter is set to 'high' and 3D noise reduction is set to 'low', to avoid motion trails.

The 'music' genre (F2) frequently includes flashy scenes with strong light-dark contrasts. To enhance these contrasts, the contrast parameter is set to 'high', a gamma curve that enhances (stretches) the black and white ends of the luminance scale is used, and backlight brightness and overdrive are set to 'high'. Since the main subjects are people, sharpness and 3D noise reduction are set to 'medium'.

The 'studio' genre (F3) has a high average luminance level with many bright scenes, so the gamma correction is set to enhance the white side of the luminance scale, while contrast is set to 'low' to reduce the luminance slightly, because brightness causes eyestrain, and backlight brightness is set to 'medium'. Since news and data screens frequently appear, sharpness is set to 'high'. Since motion is normal, overdrive is set to 'medium'.

The 'movie' genre (F4) is characterized by frequent dark screens, so contrast is set to 'high', the gamma correction is set to enhance the black side of the luminance scale, and backlight brightness is set to 'low' to provide greater contrast by reducing the enhanced luminance levels. Sharpness is set to 'low' in order to obtain a soft picture quality suitable for movies. Since movies often introduce noise intentionally for visual effect, 3D noise reduction is set to 'low'. Since motion is normal, overdrive is set to 'medium'.

The 'drama and animation' genre (F5) tends to include many pixels with somewhat low luminance levels, so contrast is set to 'high', the gamma correction is set to enhance intermediate tones, and backlight brightness is set to 'medium'. Since animated dramas have sharp outlines, sharpness is set to 'medium', and since they tend to use areas of solid color and have relatively little motion, the overdrive parameter is set to 'low'. Since acted dramas contain moderate amounts of noise, the 3D noise reduction parameter is set to 'medium'.

These above are an example of initial picture quality settings; these settings may be changed if the user prefers different settings.

The video correction control signal Pi includes a color depth parameter in addition to the luminance parameters shown in FIG. 13. The color depth parameter is determined with reference to the color saturation information Sa. The correction controller 6 determines the color saturation of the input video signal with reference to the color saturation information Sa and controls the video correction so that the video picture is displayed with appropriate color depth. More specifically, a reference saturation value is preset and the video correction control signal Pi is controlled as follows. If the color saturation information Sa indicates a saturation level below the reference saturation value, the video correction control signal Pi is adjusted to increase the color depth. If the color saturation information Sa indicates a saturation level above the reference saturation value, the video correction control signal Pi is adjusted to reduce the color depth. The reference saturation value may be permanently preset in the design stage or may be made adjustable according to user preferences. When the reference saturation value is permanently preset, it is preferably set in consideration of the color reproduction characteristics of the display unit 4, particularly its gamut of reproducible colors. The same color tends to be displayed with higher saturation when the display unit 4 has a wide gamut of reproducible colors than when the display unit 4 has a narrow gamut of reproducible colors. Accordingly, when the display unit 4 has a wide gamut of reproducible colors, setting the reference color saturation to a comparatively low value can prevent displayed colors from becoming over-saturated; when the display unit 4 has a narrow gamut of reproducible colors, setting the reference color saturation to a comparatively high value can prevent the displayed colors from appearing pale.

Picture quality settings such as contrast, sharpness, and the like may be controlled and changed at will by the user by, for example, button operations on a remote control unit. After changing the preset picture quality settings, the user may be able to store the changed settings for automatic recall later. Conventionally, when a movie program is selected, for example, the user has been able to recall previously adjusted movie-like picture quality settings by operating the buttons on a remote control unit or using an on-screen menu. According to the present embodiment, when the movie program begins, the movie-like picture quality settings preset by the user are selected automatically, so the picture is optimized without further user effort. Conventionally, if the movie program is followed by a brightly lighted studio program such as a variety program, then unless the user manually selects new picture quality settings suitable for a studio broadcast, the user will see a studio picture that looks unnaturally dim, because the dark settings suitable for a movie remain in effect. According to the present embodiment, however, the appropriate studio picture quality settings are selected automatically, so the optimum bright picture is obtained without the need for user intervention.

When a frame sequence classification value Fi is obtained, the corresponding genre may be indicated in an on-screen display. If the program content is classified as movie content, for example, the word 'movie' may be displayed. Alternatively, the classification may be displayed when the picture quality correction parameters are changed at a scene change detection timing.

The frame buffer 7 stores one or more frames of the video signal Db in a memory, and outputs the stored signal with a delay to the video corrector 5 as the video signal Dc. Since the luminance information detector 9 creates a histogram from one frame of the video information, the output of the luminance information detector 9 is delayed by one frame period. The frame buffer 7 needs to compensate for this delay by delaying the output signal by one frame period. The frame buffer 7 may also provide a further delay to compensate for the processing delay in the content analyzer 11. Changes in the video correction parameters can then be made retroactive to the preceding scene change, as described later, instead of having to wait until the next scene change.

The role of the frame buffer 7 may be assumed by another signal processing circuit that produces a frame delay. Such circuits are common in video display apparatus. Examples of signal processing circuits with frame delays include an interlaced-to-progressive (IP) converter, a frame rate converter, and a resizer. If IP conversion produces a one-frame delay, for example, the video signal before IP conversion may be supplied to the luminance information detector 9, and the video signal output from the IP converter may be supplied to the video corrector 5 to undergo picture quality correction. The frame buffer 7 can then be eliminated from the video processor 3, reducing its cost.

When the content analyzer 11 employs only the second method described above, a period of M+1 frames elapses from input of the first frame in a series of M frames with identical content type to output of a frame sequence classification value. The delay is M+1 frames instead of M frames because of the one-frame delay in the luminance information detector 9. If the frame buffer 7 is configured to provide an (M+1)-frame delay, then when a scene change occurs, if the content of the new scene can be classified on the basis of the first M frames in the scene (if they have identical content type), then a new set of picture quality correction parameters can be applied to all M frames in the series, as well as to subsequent frames.

Since the first frame of the above series of M frames is the first frame after the scene change, the scene change can be detected by detecting the change in the frame sequence classification, so that it is not necessary to provide a separate scene change detector 12. That is, the content analyzer 11 also functions as the scene change detector.

When the content classification changes, this method allows the use of a new set of picture quality correction parameters to start from the first scene in which the new content classification is detected. Changes in the picture quality correction parameters now occur only at scene changes at which the content classification changes, making the change in picture quality characteristics even more inconspicuous.

When the content analyzer 11 employs the first method, the frame sequence classification value Fi is not always output after a constant number of frames. When the content analyzer 11 employs the third method, the picture K frames before might not fit the new frame sequence classification value Fi. Accordingly, when the first or third method is employed or when one or both of these methods are employed in combination with each other or with another method, it suffices for the frame buffer 7 to generate a one-frame delay to compensate for the one-frame histogram accumulation delay in the luminance information detector 9.

If the content analyzer 11 is omitted and control is performed on a per frame basis, generating a one-frame delay in the frame buffer 7 makes it possible to perform a picture quality correction on the current frame according to its own content classification, so that the picture quality correction parameters are changed in real time. In addition, since scene changes already coincide with timings at which the frame content classification value Ji is output, the scene change detector 12 may be omitted. In effect, a scene change is regarded as occurring whenever the output of the content classifier 10 changes.

Regardless of the size of the frame buffer 7, the luminance information detector 9 creates a histogram from one frame of the video signal, which results in a one-frame delay in the frame type detection result. To compensate for this delay and synchronize the detection result with the current video frame, the input video signal Db must be delayed by at least one frame period in the frame buffer 7. It is desirable for the frame buffer 7 to provide a sufficient delay to compensate for the delays in detection of the frame sequence classification value Fi and the delay of the scene change detection signal SC with respect to the video signal. Such compensation makes it possible to synchronize changes in the picture quality correction parameters with changes in the content type of the video signal, thereby making the changes appear more natural.

The scene change detector 12 detects a scene change according to the luminance information Yi output from the luminance information detector 9 and, when a scene change occurs, outputs the scene change detection signal SC to the correction controller 6. Output of the scene change detection signal SC means that the scene change detection signal SC is set to the 'true' logic level, e.g., the '1' logic level, for a certain time. When the scene change detection signal SC is kept at the 'false' logic level, e.g., the '0' logic level; this can be expressed by saying that the scene change detection signal SC is not output. It is desirable that the scene change detection signal SC be output as quickly as possible after the completion of an effective picture interval.

Figures 14, 15:
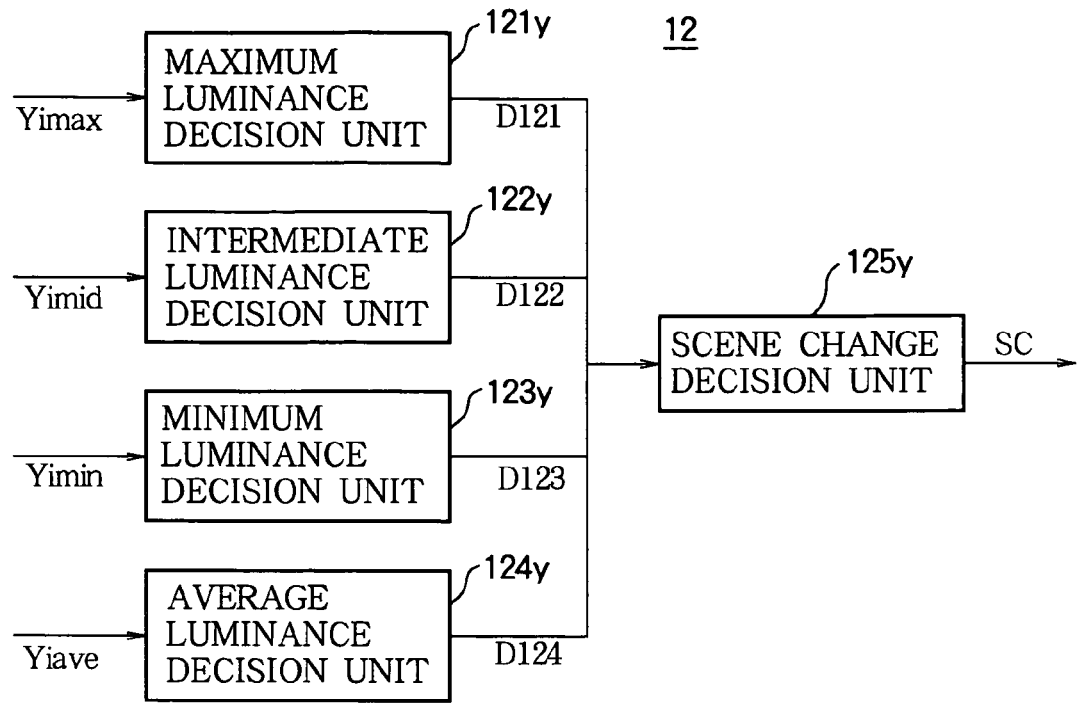
FIG. 14 is a block diagram showing an example of the structure of the scene change detector in FIG. 1.
FIG. 15 is a table showing combinations of a maximum luminance decision value D121, an intermediate luminance decision value D122, a minimum luminance decision value D123, and an average luminance decision value D124 used in the scene change detector to determine scene changes.

Referring to FIG. 14, the scene change detector 12 includes, for example, a maximum luminance decision unit 121y, an intermediate luminance decision unit 122y, a minimum luminance decision unit 123y, an average luminance decision unit 124y, and a scene change decision unit 125y.

The maximum gradation information Yimax output from the luminance information detector 9 is input to the maximum luminance decision unit 121y, the intermediate gradation information Yimid is input to the intermediate luminance decision unit 122y, the minimum gradation information Yimin is input to the minimum luminance decision unit 123y, and the average gradation information Yiave is input to the 124y.

The maximum luminance decision unit 121y, intermediate luminance decision unit 122y, minimum luminance decision unit 123y, and average luminance decision unit 124y are similar to the maximum luminance decision unit 110y, intermediate luminance decision unit 102y, minimum luminance decision unit 103y, and average luminance decision unit 104y in the content classifier 10 shown in FIG. 4.

That is, the maximum luminance decision unit 121y classifies the maximum luminance magnitude on the basis of the maximum gradation information Yimax and outputs the result of this classification as a maximum luminance decision value D121.

The intermediate luminance decision unit 122y classifies the intermediate luminance magnitude on the basis of the intermediate gradation information Yimid and outputs the result of this classification as an intermediate luminance decision value D122.

The minimum luminance decision unit 123y classifies the minimum luminance magnitude on the basis of the minimum gradation information Yimin and outputs the result of this classification as a minimum luminance decision value D123.

The average luminance decision unit 124y classifies the average luminance magnitude on the basis of the average gradation information Yiave and outputs the result of this classification as an average luminance decision value D124.

As in FIG. 5, the maximum luminance decision unit 121y determines whether the maximum gradation information Yimax is less than a predetermined first maximum luminance decision threshold Ymaxa, between the first maximum luminance decision threshold Ymaxa and a predetermined second maximum luminance decision threshold Ymaxb, or greater than the second maximum luminance decision threshold Ymaxb, the second maximum luminance decision threshold Ymaxb being greater than the first maximum luminance decision threshold Ymaxa. One of the three values Yimax-small, Yimax-medium, and Yimax-large is then output to the scene change decision unit 125y as the maximum luminance decision value D121.

As in FIG. 6, the intermediate luminance decision unit 122y determines whether the intermediate gradation information Yimid is less than a predetermined first intermediate luminance decision threshold Ymida, between the first intermediate luminance decision threshold Ymida and a predetermined second intermediate luminance decision threshold Ymidb, or greater than the second intermediate luminance decision threshold Ymidb, the second intermediate luminance decision threshold Ymidb being greater than the first intermediate luminance decision threshold Ymida. One of the three values Yimid-small, Yimid-medium, and Yimid-large is then output to the scene change decision unit 125y as the intermediate luminance decision value D122.

As shown in FIG. 7, the minimum luminance decision unit 123y determines whether the minimum gradation information Yimin is less than a predetermined first minimum luminance decision threshold Ymina, between the first minimum luminance decision threshold Ymina and a predetermined second minimum luminance decision threshold Yminb, or greater than the second minimum luminance decision threshold Yminb, the second minimum luminance decision threshold Yminb being greater than the first minimum luminance decision threshold Ymina. One of the three values Yimin-small, Yimin-medium, and Yimin-large is output to the scene change decision unit 125y as the minimum luminance decision value D123.

The average luminance decision unit 124y determines whether the average gradation information Yiave calculated by the above equation (1) is less than a predetermined first average luminance decision threshold Yavea, between the first average luminance decision threshold Yavea and a predetermined second average luminance decision threshold Yaveb, or greater than the second average luminance decision threshold Yaveb, the second average luminance decision threshold Yaveb being greater than the first average luminance decision threshold Yavea. One of the three values Yiave-small, Yiave-medium, and Yiave-large is then output to the scene change decision unit 125y as the average luminance decision value D124.

The scene change decision unit 125y recognizes scene changes from the four decision values D121, D122, D123, D124 and outputs the scene change detection signal SC when it detects a scene change.

A scene change may be recognized as having occurred when a predetermined number or more of the four decision values D121, D122, D123, D124 changes (the value in the current frame differs from the value one frame before). The predetermined number is set separately, and may be one, two, or a higher number.

Since each of the four decisions values can have one of three values (small, medium, large), there are 3×3×3×3=81 combinations of the four decision values, as shown in FIG. 15. A change in one or more of the four decision values D121, D122, D123, D124 is regarded as a transition from one to another of the 81 combinations shown in FIG. 15.

The changes to an all black screen (Yiave, Yimin, Yimid, and Yimax all have small values) and an all white screen (Yiave, Yimin, Yimid, and Yimax all have large values) may always be regarded as scene changes and may be treated like other scene changes. This is because, particularly on an all black screen, a change in the picture quality correction parameters is practically invisible.

When the threshold values (Ymaxa, Ymaxb, Ymida, Ymidb, Ymina, Yminb, Yavea, Yaveb) used in the maximum luminance decision unit 121y, intermediate luminance decision unit 122y, minimum luminance decision unit 123y, and average luminance decision unit 124y of the scene change detector 12 have the same values as the threshold values (Ymaxa, Ymaxb, Ymida, Ymidb, Ymina, Yminb, Yavea, Yaveb) used in the maximum luminance decision unit 110y, intermediate luminance decision unit 102y, minimum luminance decision unit 103y, and average luminance decision unit 104y of the content classifier 10, the decision values (D121, D122, D123, D124) output from maximum luminance decision unit 121y, intermediate luminance decision unit 122y, minimum luminance decision unit 123y, and average luminance decision unit 124y become identical to the decision values (D101, D102, D103, D104) output from maximum luminance decision unit 101y, intermediate luminance decision unit 102y, minimum luminance decision unit 103y, and average luminance decision unit 104y. Accordingly, the relationships between the former decision values (D121, D122, D123, D124) and content types are the same as the relationships between the latter decision values (D101, D102, D103, D104) and the frame content classification value Ji shown in FIG. 8.

When the content classifier 10 outputs one of K (K<81) frame content classification values Ji (i=1 to K) as in FIG. 9, if the combination of decision values D121, D122, D123, D124 after a scene change corresponds to the frame sequence classification value Fi currently being output from the content analyzer 11, then the old scene and the new scene are of the same type (the same program genre). In this case, since it is not necessary to change the picture quality correction parameters, the scene change detection signal SC need not be output to the correction controller 6. Alternatively, the scene change detection signal SC may be output, but the correction controller 6 may be controlled so that the video correction control signal Pi and the display control signal Ci are not updated.

When the combination of decision values D121, D122, D123, D124 output after a scene change corresponds to the frame sequence classification value Fi currently being output from the content analyzer 11, however, if the current video correction control signal Pi and display control signal Ci are unsuitable for the type (genre) corresponding to the current frame sequence classification value Fi, the scene change detection signal SC becomes the trigger for the correction controller 6 to change the video correction control signal Pi and display control signal Ci to match the frame sequence classification. This occurs when the frame buffer 7 does not compensate for the frame sequence classification delay.

In order to complete the process of changing the picture quality correction parameters within the vertical blanking interval, the scene change detector 12 should output the scene change detection signal SC within the vertical blanking interval following the frame at which the scene change is detected. Specifically, a video signal on which a delay compensation has been performed by the frame buffer 7 is input to the video corrector 5; the video correction control signal Pi and display control signal Ci are output according to the scene change detection signal SC from the correction controller 6 within the vertical blanking interval between the frames immediately before and after the scene change of the video signal input to the video corrector 5; and the changes of the picture quality correction parameters and the display control parameters are completed within the vertical blanking interval.

Because the scene change detection signal is output in the blanking interval at the end of the frame at which the scene change occurs, the scene change detection signal is delayed by one frame from the scene change. Therefore, the frame buffer 7 must provide at least a one-frame compensatory delay, so that the video corrector 5 can perform an appropriate video correction on the first frame of the new scene. Since the corrected output video signal Dd reaches the display unit 4 with a similar delay, the display control parameters can also be modified in synchronization with the scene change.

The scene change decision unit 125y may determine scene changes on the basis of fewer than four decision values. For example, scene changes may be recognized from the average luminance decision value alone. Although in FIG. 15 the luminance values are classified using two threshold values so that each decision value has one of three values, labeled 'large', 'medium', and 'small', this is not a limitation; decision values having one of two values, or one of four or more values, may be generated by using different numbers of threshold values.

Alternatively, instead of operating according to discrete levels such as 'large', 'medium', and 'small', the scene change detector 12 may compare the maximum gradation information Yimax, intermediate gradation information Yimid, minimum gradation information Yimin, and average gradation information Yiave output from the luminance information detector 9 directly. For example, the maximum gradation information Yimax, intermediate gradation information Yimid, minimum gradation information Yimin, and average gradation information Yiave of the current frame may be compared with the maximum gradation information Y(i−1)max, intermediate gradation information Y(i−1)mid, minimum gradation information Y(i−1)min, and average gradation information Y(i−1)ave of the preceding frame, the absolute values of the differences may be taken, and a scene change may be recognized when a predetermined number of absolute values exceed respective threshold values Rymax, Rymid, Rymin, and Ryave. The predetermined number may be one, two, or a larger number.

Figure 16:
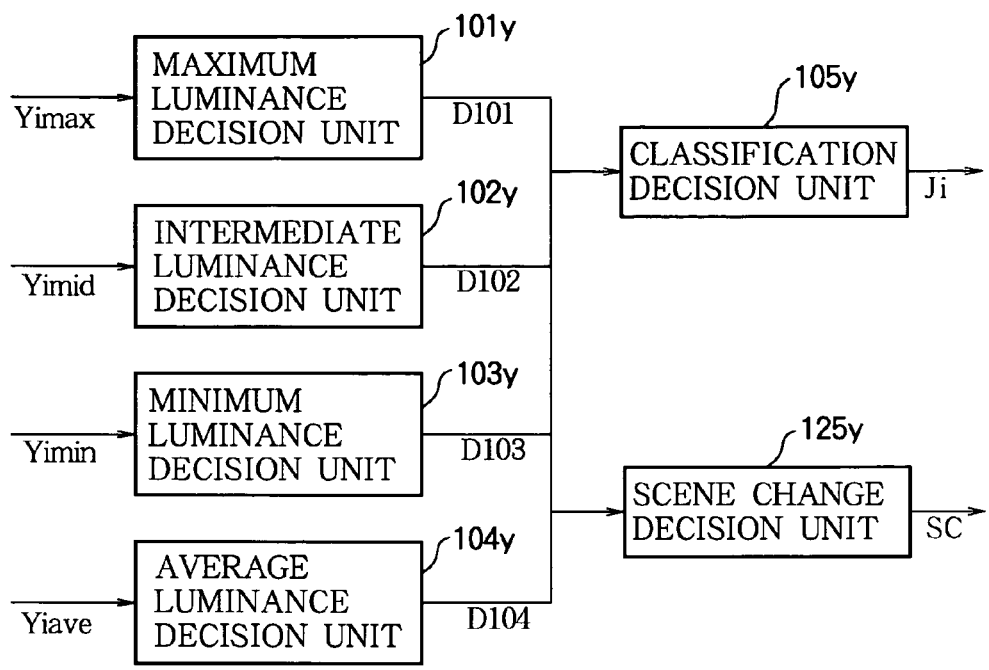
FIG. 16 is a block diagram showing how the content classifier and scene change detector in FIG. 1 may be combined.

When the maximum luminance decision unit 121y, intermediate luminance decision unit 122y, minimum luminance decision unit 123y, and average luminance decision unit 124y in the scene change detector 12 have the same configuration as the maximum luminance decision unit 101y, intermediate luminance decision unit 102y, minimum luminance decision unit 103y, and average luminance decision unit 104y in the content classifier 10, as in FIGS. 4 and 14, the content classifier 10 and scene change detector 12 may share the same maximum luminance decision unit, intermediate luminance decision unit, minimum luminance decision unit, and average luminance decision unit. The scene change detector 12 in FIG. 1 may then be replaced by a scene change decision unit 125y built into the content classifier 10 to receive the outputs of the maximum luminance decision unit 110y, intermediate luminance decision unit 102y, minimum luminance decision unit 103y, and average luminance decision unit 104y as shown in FIG. 16. This shared structure reduces the system cost.

Figure 17:
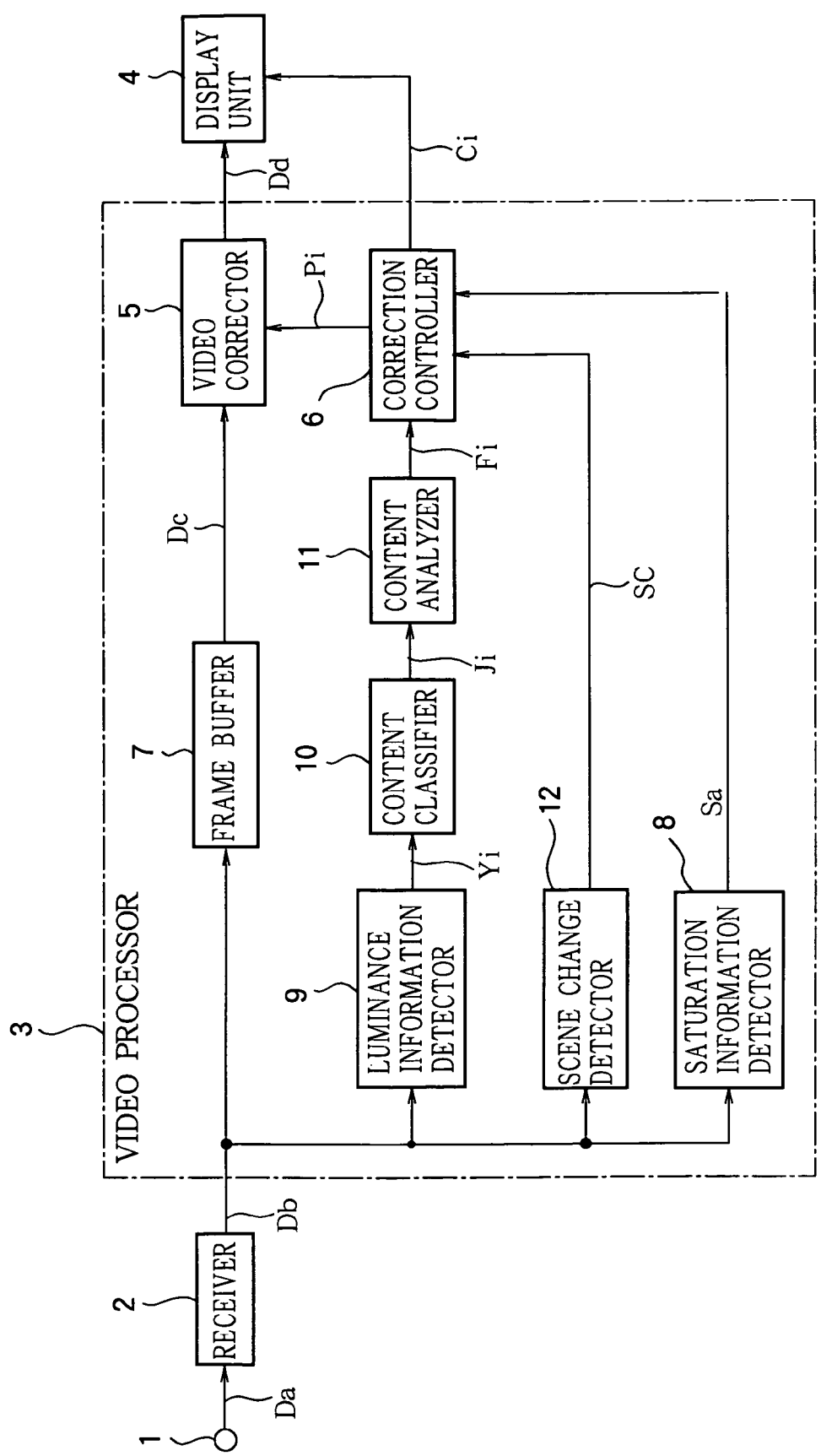
FIG. 17 is a block diagram illustrating an alternative configuration of the video display apparatus in FIG. 1.

Referring to FIG. 17, the scene change detector 12 may receive the video signal Db instead of the output of the luminance information detector 9. Known methods of detecting scene changes from a video signal can then be used. For example, the effective picture area of a frame may be divided into M×N blocks, and the average luminance $YS_{m,n}(i)$ of each block may be calculated and compared with the average luminance $YS_{m,n}(i-1)$ of the corresponding block in the preceding frame (where i is an integer identifying the frame, m is an integer from 1 to M, and n is an integer from 1 to N). If the number V of blocks in which the average luminance difference $YS_{m,n}(i)-YS_{m,n}(i-1)$ is equal to or greater than a predetermined threshold value U in at least a predetermined number of blocks, such as half the total number of blocks in the effective picture area, a scene change is recognized and the scene change detection signal SC is output.

Alternatively, if a known IP conversion circuit, signal processing circuit, or the like including a scene change detection facility is used, the scene change detection result output from this circuit may be used. The scene change detection method described in JP 2004-7301 may also be employed.

Regardless of how scene changes are detected, if the correction controller 6 updates the signals Pi and Ci that control the video corrector 5 and display unit 4 only at scene change timings, and changes the picture quality correction parameters within the vertical blanking interval between the frames immediately before and after the scene change, the viewer will not find the resulting changes in picture characteristics unnatural.

By generating frame content classification values on the basis of maximum, intermediate, minimum, and average gradation information obtained from a luminance histogram created from one frame of the input video signal Db as described above, the novel video display apparatus can accurately classify the content and genre of the input video signal Db.

If the frame buffer 7 compensates for delays occurring in the luminance information detector 9, the content analyzer 11, and the scene change detector 12, and the control signals supplied to the display unit 4 and video corrector 5 are changed only at scene change timings detected by the scene change detector 12, switchovers between different sets of picture quality correction parameters can be made to appear natural.

Since the picture quality correction is performed according to the frame sequence classification value Fi determined from the input video signal Db, an optimum picture quality correction can be obtained that is suited for the characteristics and genre of the video content. In addition, once the video content characteristics and genre have been determined, appropriate adjustments can be made not only to the luminance component of the video signal, but also to the color component and to display device control parameters to obtain appropriate sharpness, motion response, and so on.

When the video display apparatus is equipped with an audio output unit (not shown), as in a television receiver, for example, audio adjustments suitable for the video content and genre can also be performed.

Unlike JP 10-322622, the present embodiment can respond to a change in video content in the middle of a program. When information indicating the 'movie' genre is broadcast together with program data in a digital broadcast, for example, JP 10-322622 adjusts the picture quality to be 'movie-like' from the beginning to the end of the program, so the movie-like picture quality correction is applied even to commercial segments interspersed in the program. The present embodiment makes it possible to perform a more suitable picture quality correction on these segments. Furthermore, when a movie program has a sports theme, JP 10-322622 performs a movie-like picture quality correction throughout the movie, whereas the present embodiment detects content characteristics and, during sports scenes in the movie, performs a picture quality correction more suitable for sports scenery, which tends to be brighter than typical movie scenes. The present embodiment accordingly prevents inappropriate corrections due to a difference between the genre information broadcast together with program data and the actual video content, and performs appropriate corrections, suitable for the video content of each part of the program, even if the content type changes from scene to scene.

In a variation of the present invention, the classification scheme described above is used in combination with the genre information included in digital broadcasts, or with a classification scheme based on such information, such as the scheme described in JP 10-322622, to increase the accuracy of the content type (genre) classification. For example, the genre information included in a digital broadcast may be used as an initial classification value.

Those skilled in the art will recognize that further variations are possible within the scope of the invention, which is defined in the appended claims.

What is claimed is:

1. A video display apparatus comprising:
a luminance information detector for receiving a video signal divided into frames, creating a luminance histogram from one frame of a luminance signal derived from the video signal, and generating luminance information from the luminance histogram;
a content classifier for classifying the content of the one frame according to the luminance information generated by the luminance information detector and generating a first classification value;
a content analyzer for analyzing the first classification values output by the content classifier for a plurality of frames to obtain a second classification value;
a saturation information detector for receiving the video signal, creating a color saturation histogram from at least one frame of a color saturation signal derived from the video signal, and generating color saturation information from the color saturation histogram;
a scene change detector for detecting scene changes in the video signal and generating a scene change detection signal;
a correction controller for outputting a video correction control signal and a display control signal, based on the second classification value, the scene change detection signal, and the color saturation information;
a video corrector for performing a video correction on the video signal, based on the video correction control signal; and
a display unit displaying a video picture according to the video signal output from the video corrector and performing display control according to the display control signal.

2. The video display apparatus of claim 1, wherein the luminance information detector generates maximum gradation information, intermediate gradation information, minimum gradation information, and average gradation information from the luminance histogram as the luminance information, and the content classifier classifies the video subject matter and generates the first classification value on the basis of the maximum gradation information, the intermediate gradation information, the minimum gradation information, and the average gradation information generated by the luminance information detector.

3. The video display apparatus of claim 1, further comprising a frame buffer for delaying the video signal by a positive integer number of frames, wherein the video corrector performs the video correction on the video signal delayed by the frame buffer.

4. The video display apparatus of claim 3, wherein the frame buffer compensates for delays occurring in the luminance information detector, the scene change detector, and the content analyzer.

5. The video display apparatus of claim 2, wherein:
the content classifier comprises a luminance decision unit that classifies luminance magnitudes and generates luminance decision values, and a classification decision unit that classifies the video content on the basis of the luminance decision values;
the scene change detector comprises a luminance decision unit that classifies luminance magnitudes and generates luminance decision values, and a scene change decision unit that determines scene changes from the luminance decision values; and the luminance decision unit is shared by the content classifier and the scene change detector.

6. The video display apparatus of claim 2, wherein the scene change detector detects scene changes on the basis of the maximum gradation information, the intermediate gradation information, the minimum gradation information, and the average gradation information generated by the luminance information detector.

7. The video display apparatus of claim 1, wherein the correction controller computes the video correction control signal and the display control signal in a blanking interval during a scene change.

8. The video display apparatus of claim 1, wherein the video correction performed by the video corrector includes at least one of luminance contrast control, sharpness control, color depth control, three-dimensional noise reduction, and a gamma correction.

9. The video display apparatus of claim 1, wherein the display unit comprises a liquid crystal display panel with a backlight, and the display control performed by the display unit includes at least one of motion response control and backlight brightness control, motion response control being performed by overdriving.

* * * * *